US 6,651,966 B2

(12) United States Patent
Hettler

(10) Patent No.: US 6,651,966 B2
(45) Date of Patent: Nov. 25, 2003

(54) AGGREGATE BEARING IN BUSHING FORM

(75) Inventor: Werner Hettler, Mannheim (DE)

(73) Assignee: Carl Freudenberg KG, Weinheim (DE)

( * ) Notice: Subject to any disclaimer, the term of this patent is extended or adjusted under 35 U.S.C. 154(b) by 7 days.

(21) Appl. No.: 10/118,796

(22) Filed: Apr. 9, 2002

(65) Prior Publication Data

US 2003/0001324 A1 Jan. 2, 2003

(30) Foreign Application Priority Data

Jun. 27, 2001  (DE) .......................... 101 31 105

(51) Int. Cl.[7] .............. F16F 1/44; F16F 15/00
(52) U.S. Cl. ............. 267/140.12; 267/293; 29/896.63; 248/634
(58) Field of Search .................. 29/896.63; 248/634, 248/635, 638; 267/140.11, 141.7, 293

(56) References Cited

U.S. PATENT DOCUMENTS

| 4,768,760 | A | * | 9/1988 | Le Fol ................. 267/140.12 |
| 5,026,031 | A | * | 6/1991 | Court .................. 267/140.12 |
| 5,152,510 | A | * | 10/1992 | Komabashiri ............ 267/141.2 |
| 5,154,403 | A | * | 10/1992 | Sato ..................... 267/141.2 |
| 5,295,653 | A | * | 3/1994 | Miyazaki et al. ........... 248/675 |
| 5,865,429 | A | * | 2/1999 | Gautheron ................ 267/141.7 |
| 6,213,455 | B1 | * | 4/2001 | Kato et al. ............... 267/141.2 |
| 6,382,605 | B1 | * | 5/2002 | Kato ..................... 267/141.2 |
| 6,439,557 | B1 | * | 8/2002 | Stitt ....................... 267/141 |

FOREIGN PATENT DOCUMENTS

DE          38 40 176          5/1990

* cited by examiner

Primary Examiner—Jack Lavinder
Assistant Examiner—Robert A Siconolfi
(74) Attorney, Agent, or Firm—Kenyon & Kenyon

(57) ABSTRACT

An aggregate bearing (1) in bushing form having an outer ring (2) and an elastomeric coating (3) and an inner support part (4), as well as rubber springs (5, 6) arranged in-between; axial penetrations (8, 9) are provided between the outer ring (2) and stop buffer (7) located in the direction of the main load (10); and, prior to the bearing being put into use for the first time, the stop buffer(7) located in the main load direction (10) and the inner elastomeric coating (3) of the outer ring (2) are connected to one another by at least one cross-piece (12) arranged in the axial direction of the bearing (1) and designed as a preset rupture joint, in order to achieve as early a progression onset as possible in the direction of the pull.

2 Claims, 2 Drawing Sheets

AGGREGATE BEARING IN BUSHING FORM

BACKGROUND OF THE INVENTION

1. Field of the Invention

The invention relates to an aggregate bearing in bushing form, having an outer ring which is provided with an elastomeric coating, and an inner support part, as well as rubber springs arranged in-between.

2. Description of Related Art

In the known aggregate bearings of this kind, the rubber springs are vulcanized into the gap between the outer ring and the support part. This method tends to cause the rubber springs to shrink during the cooling of the bearing after vulcanization, resulting in an enlargement of the gap, which can have a disadvantageous effect on the desired bearing characteristics.

In order to avoid the above-mentioned disadvantage, it has become known from German Patent 3 840 176 C2 to insert an additional element into the gap thus enlarged, thereby achieving elastic prestressing. Bearings whose outer ring surface is not provided with an elastomeric coating may be calibrated without difficulty during installation in an appropriate mounting support. Calibration also makes it possible to design the aggregate bearing without the mentioned additional element and to install it in the mounting device. In doing so, the gap is entirely or at least partially eliminated.

However, when working with bearings whose outer ring is provided with an elastomeric coating, this calibration is difficult to accomplish. On the other hand, the elastomeric coating has the advantage of making redundant the relatively expensive corrosion protection for the metallic outer ring. Generally, rubber springs are designed with an axial penetration, which, however, again has the disadvantage that the axial penetration (and the shrinkage measurement) must be bridged in rebound travel, which may be incompatible with the spring characteristic required by the customer.

SUMMARY OF THE INVENTION

It is an object of the invention to create an aggregate bearing that can be manufactured inexpensively and in which the progression course of the spring action has an early onset, despite the existence of an axial penetration and a shrinkage gap.

These and other objects of the invention are achieved in an aggregate bearing in bushing form having an outer ring provided with an elastomeric coating and an inner support part as well as rubber springs arranged in-between; in order to achieve the desired bearing characteristic, axial penetrations are provided between the outer ring and the inner support part or stop buffer bearing the main load, in that prior to the bearing being put into use for the first time, the stop buffer located in the main load direction, and the inner elastomeric coating of the outer ring are connected to one another by at least one cross-piece arranged in the axial direction of the bearing and designed as a preset rupture joint.

BRIEF DESCRIPTION OF THE DRAWINGS

The present invention will be described in greater detail with reference to the following drawings wherein.

DETAILED DESCRIPTION OF THE INVENTION

Figure 1:
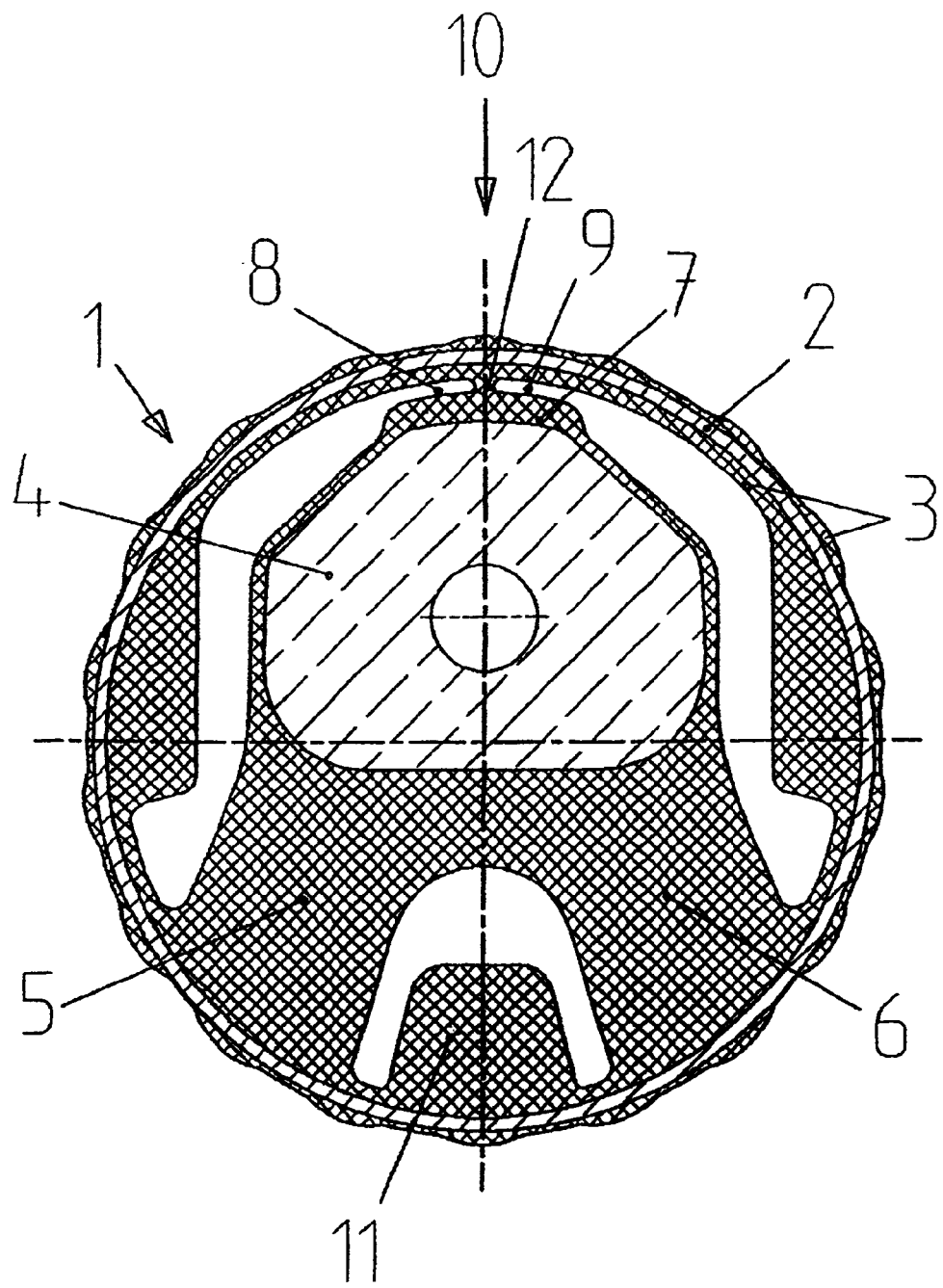
FIG. 1 shows an aggregate bearing in cross-section.

Designing the bearing in such a way makes it possible to produce a bearing having an axial penetration, so that the disadvantages due to shrinkage are eliminated. In the finished bearing, there is a gap between the outer ring of the bearing and the stop buffer at the axial penetration, the size of the gap resulting from the shrinkage measurement of the rubber springs and the free path formed by the axial penetration. The cross-piece remaining between the inner support part, i.e. stop buffer, and the outer ring is unable to withstand the forces occurring during shrinkage. When the bearing is being put into use for the first time, the cross-piece ruptures at the preset rupture joint. The portions of the ruptured cross piece that remain on the outer ring and the stop buffer, respectively, have a surprisingly advantageous effect on the progression of the spring action. An earlier stop occurs during rebound since first the ruptured ends of the cross-piece come to rest against one another. Depending on the design, they have a distinct effect on the spring characteristic of the bearing. Essentially, aggregate bearing 1 shown in FIG. 1 is made of outer ring 2 having an elastomeric coating 3, inner support part 4 as well as rubber springs 5 and 6. Stop buffer 7, which is stub-shaped, is located on the upper part of support part 4. Axial penetrations 8 and 9 are located between stop buffer 7 and outer ring 2. Stop buffer 7 is located in main load direction 10, which is indicated by arrows. Bracing of the bearing is mainly provided by springs 5 and 6 designed in v-shape. A stop buffer 11 is arranged between springs 5 and 6.

During production of the bearing, cross-piece 12, which connects elastomeric coating 3 to stop buffer 7, remains between the two axial penetrations 8 and 9. The gap dimension of penetrations 8 and 9 is generally subject to production techniques. It is also possible to provide for a plurality of cross-pieces with their preset rupture joints.

Figure 2:
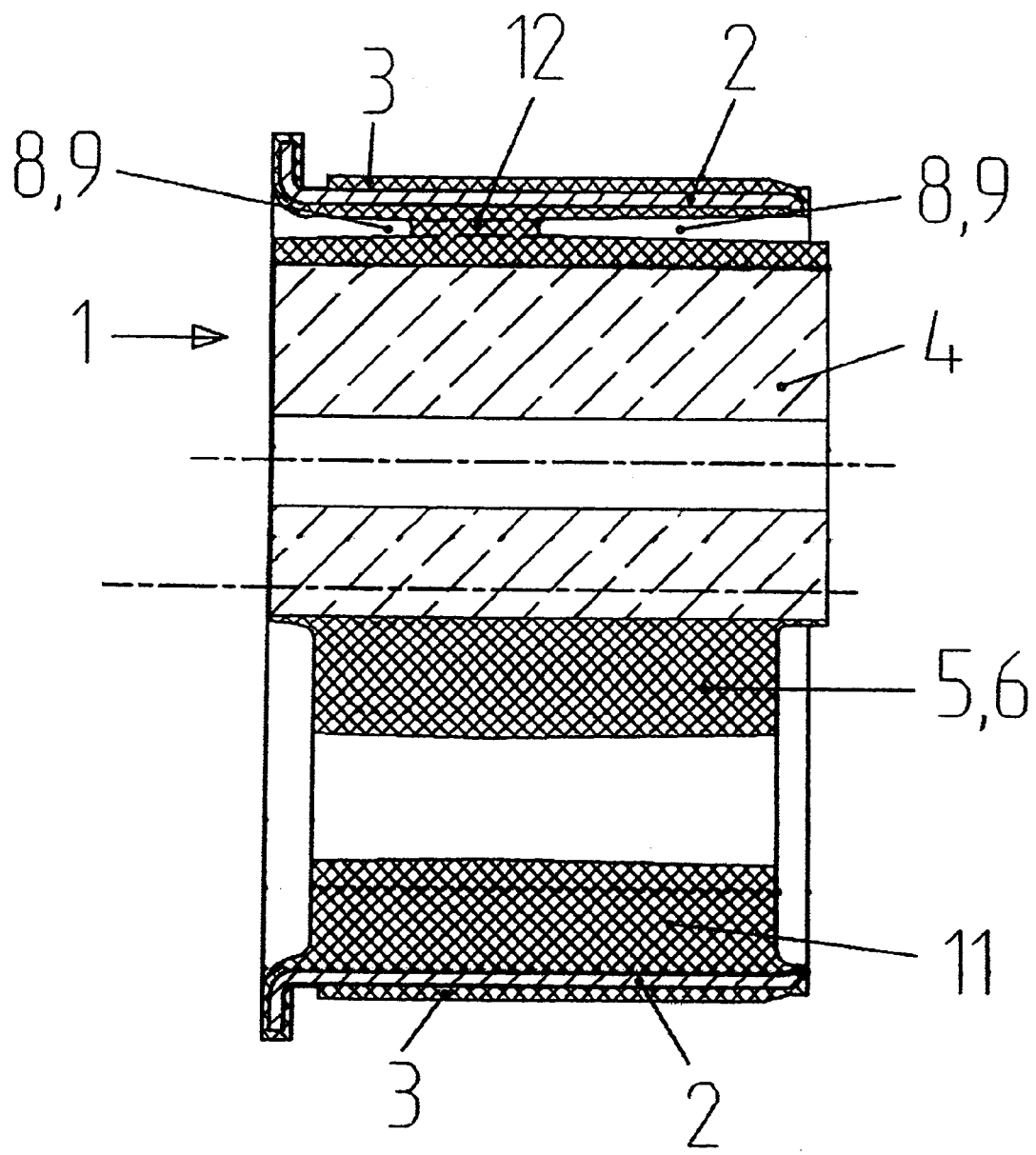
FIG. 2 shows the aggregate bearing in longitudinal section.

In FIG. 2, bearing 1 is shown in longitudinal section. The longitudinal section corresponds to a section in main load direction 10. The length of cross-piece 12 can be seen here, which is shorter in the exemplary embodiment than the length of bearing 1. Outer ring 2 has a flange-like formation on its left side and is entirely surrounded by elastomeric coating 3. Support part 4 is made of metal and is braced on spring legs 5 and 6. During the first spring deflection of the bearing, the distance traveled by support part 4 is so large that cross-piece 12 ruptures. However, torn cross-piece 12 and its parts will exert an influence again when bearing 1 rebounds and support part 4 with the stop buffer moves upward until the impact initially against the cross-piece parts, and then against outer ring 2.

What is claimed is:

1. An aggregate bearing (1) in bushing form, comprising an outer ring (2) and an elastomeric coating (3) and an inner support part (4), as well as rubber springs (5, 6) arranged in between, axial penetrations (8, 9) being provided between the outer ring (2) and a stop buffer (7) located in a direction of a main load (10), in order to achieve the desired spring characteristic, wherein, prior to the bearing being put into use for the first time, the stop buffer (7) located in the main load direction (10) and the inner elastomeric coating (3) of the outer ring (2) are connected to one another by at least one cross-piece (12) located in the axial direction of the bearing (1) and designed as a preset rupture joint.

2. In a method for manufacturing an aggregate bearing (1) in bushing form, the aggregate bearing comprising an outer ring (2) and an elastomeric coating (3) and an inner support part (4), as well as rubber springs (5, 6) arranged in between, axial penetrations (8, 9) being provided between the outer ring (2) and a stop buffer (7) located in a direction of a main load (10), in order to achieve the desired spring characteristic, the improvement comprising, prior to using the bearing for the first time, connecting the stop buffer (7) located in the main load direction (10) and the inner elastomeric coating (3) of the outer ring (2) to one another by at least one cross-piece (12) located in the axial direction of the bearing (1), the cross-piece being designed as a preset rupture joint.

* * * * *